United States Patent

Bedzyk et al.

[11] Patent Number: 6,052,142
[45] Date of Patent: Apr. 18, 2000

[54] PRECISION ASSEMBLY TECHNIQUE USING ALIGNMENT FIXTURE AND THE RESULTING ASSEMBLY

[75] Inventors: Mark D. Bedzyk; Douglass L. Blanding, both of Rochester, N.Y.

[73] Assignee: Eastman Kodak Company, Rochester, N.Y.

[21] Appl. No.: 09/290,299

[22] Filed: Apr. 13, 1999

Related U.S. Application Data

[62] Division of application No. 09/078,296, May 13, 1998, Pat. No. 5,970,597.

[51] Int. Cl.$^7$ .................................................. H04N 1/024
[52] U.S. Cl. .......................... 347/257; 347/242; 347/262; 347/264
[58] Field of Search ................................... 347/138, 152, 347/242, 245, 257, 262, 264; 29/464, 469

[56] References Cited

U.S. PATENT DOCUMENTS 5,237,348  8/1993  Blanding et al. ........................ 347/138
5,801,891  9/1998  Lloyd ...................................... 359/871

Primary Examiner—N. Le
Assistant Examiner—Hai C. Pham
Attorney, Agent, or Firm—Thomas H. Close

[57] ABSTRACT

According to a precision assembly technique, a first subassembly is precisely aligned relative to a plurality of alignment features in an alignment fixture and at least three non-coplanar flexures having complementary alignment features are located with respect to corresponding alignment features on the alignment fixture and mechanically attached to the first subassembly. The first subassembly with the attached flexure sheets is removed from the alignment fixture and located with respect to a second subassembly having a plurality of alignment features identical to the alignment features in the alignment fixture using the alignment features on the second subassembly and the complementary alignment features on the flexure sheets to precisely align the first subassembly with the complementary alignment features on the second subassembly. The flexure sheets are then mechanically attached to the second subassembly, whereby the first and second subassemblies are aligned and rigidly connected to one another.

3 Claims, 2 Drawing Sheets

PRECISION ASSEMBLY TECHNIQUE USING ALIGNMENT FIXTURE AND THE RESULTING ASSEMBLY

CROSS REFERENCE TO RELATED APPLICATIONS

This is a divisional of Ser. No. 09/078,296, filed May 13, 1998 now U.S. Pat. No. 5,970,548. Reference is made to U.S. Ser. No. 09/078,333, filed May 13, 1998, entitled "Precision Assembly Technique" by Douglass L. Blanding; and to U.S. Ser. No. 09/078,199, filed May 13, 1998, entitled "Mount for Beam Shaping Optics In A Laser Scanner" by Douglass L. Blanding.

FIELD OF THE INVENTION

The invention relates generally to a technique for precision assembly and more particularly to a method and apparatus for accurately positioning scan line generating optics relative to an intended scan line receiving target medium; and, in particular to an improved method of locating a "drop in" optics module for a laser scanner or the like.

BACKGROUND OF THE INVENTION

The positioning of a raster scan line, like that generated by the optics of a polygon laser printer onto a photosensitive image recording medium involves assuring accurate alignment in the x (cross-scan) and z (beam path) translational directions, as well as in the θx and θz rotational directions respectively about each of the x and z directions. Proper positioning also requires attainment of the right angle of incidence of the beam onto the target medium.

Excessive focal shift errors of the scan line with respect to the recording medium can lead to a printing artifact called banding. Banding is an undesirable periodic density modulation in the image that is most noticeable in uniform density regions. A very high degree of accuracy of scan line placement is required especially for laser printers used for x-ray films, because banding artifacts can lead to false diagnoses. The eye is very sensitive to low frequency (1–8 cycles/degree) contrast modulation, having a threshold as low as 0.2% under the right illumination conditions. The design goal typically will use half this tolerance, so it will have 0.1% allowable line shift for the extreme polygon facet error. For a printer with a line pitch of 0.08 mm, the allowable error is thus only 80×10−9 mm. This requirement means that only a very small focus error can be present for the page cross section of the beam.

Scan line generating optics systems are susceptible to two types of focusing errors: those which cause deviations of the scan curve from a straight line; and those which displace the scan line from its intended generatrix line on the target drum. The f-θ condition correcting and other optical elements can be manufactured with sufficiently tight tolerances and alignment procedures to ensure the generation of an acceptably straight (i.e. non-arcuate) scan line in space.

U.S. Pat. No. 5,214,441 issued May 25, 1993 to Blanding et al., discloses a method and apparatus for ensuring the proper placement of a scan line generated by the optics of a polygon laser printer onto a recording medium supported on a rotating drum. An inexpensive mechanism is provided for setting the x, z, θx, θz and angle of incidence positioning of the scan line. Beam source, shaping and scanning optics are mounted on a rigid module and adjustable means is provided to mechanically rigidly connect the optics module to the drum. The connection is provided by two inverted V-notched blocks that are selectively positionable in an alignment fixture relative to the module frame and which are brought into nesting relationship onto cylindrical surfaces of bearings mounted coaxially with the drum shaft. The V-notched blocks are rigid plates and rely on gravity, and possibly spring clips connected between the module and the frame of the printer to augment the nesting force between the V-notched blocks and the cylindrical bearing surfaces. It has been found that acceleration forces generated when the printer is moved, for example during shipping, and/or the clamping forces generated by the spring clips can result in excessive stress and deformation of the V-notched block material at the line interfaces between the cylindrical bearing and the V-notched blocks. Any such deformation results in a corresponding alignment shift of the scan optics with respect to the imaging drum.

There is a need therefore for an improved method and apparatus for accurately positioning scan line generating optics relative to an intended scan line receiving target medium in a laser scanner.

SUMMARY OF THE INVENTION

According to the present invention, the above noted need is met by a precision assembly technique, wherein a first subassembly is precisely located relative to a plurality of alignment features in an alignment fixture, and at least three non-coplanar flexures having complementary alignment features are located with respect to corresponding alignment features on the alignment fixture and mechanically attached to the first subassembly. The first subassembly with the attached flexure sheets is removed from the alignment fixture and located with respect to a second subassembly having a plurality of alignment features identical to the alignment features in the alignment fixture using the alignment features on the second subassembly and the complementary alignment features on the flexure sheets to precisely align the first subassembly with the complementary alignment features on the second subassembly. The flexure sheets are then mechanically attached to the second subassembly, whereby the first and second subassemblies are aligned and rigidly connected to one another.

In a preferred embodiment of the invention, the technique is employed to assemble a scan optics module and a scanner body in a laser scanner.

ADVANTAGES OF THE INVENTION

The present invention is advantageous over the prior art in the following respects: accurate alignment is maintained between the subassemblies, even when the assembly is subjected to shock; the stress between the alignment features is never excessive since the alignment features are employed only momentarily until the flexures are mechanically secured to the second subassembly; and the connection between the subassemblies is rigid and does not require spring force or gravity to keep the subassemblies in alignment.

DETAILED DESCRIPTION OF THE INVENTION

Figure 1:
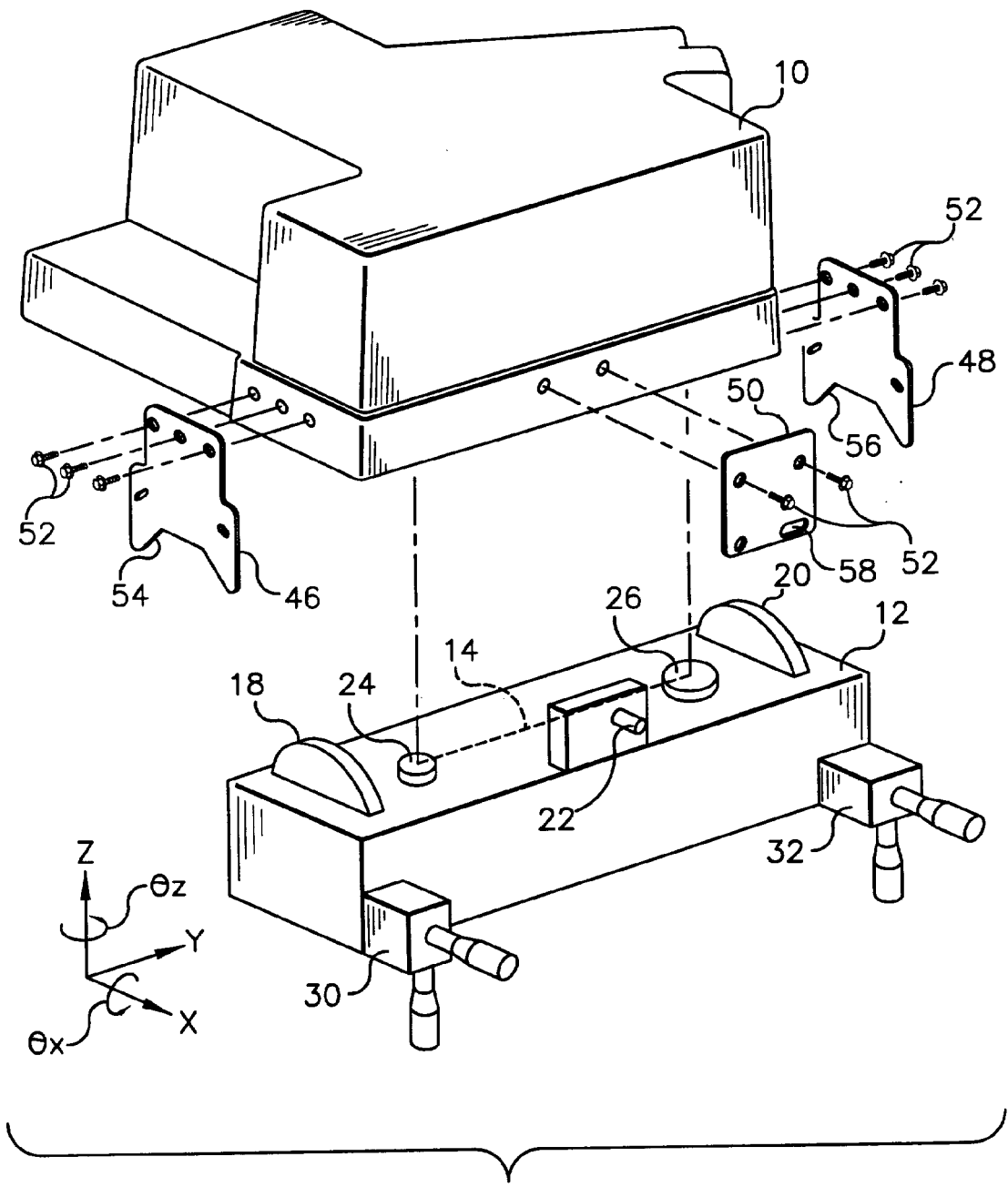
FIG. 1 is a perspective view showing sheet flexures having alignment features attached to a first subassembly in an alignment fixture having corresponding alignment features according to the present invention.

Referring to FIG. 1, a laser scanner scan optics subassembly generally designated 10 and an alignment jig generally designated 12 are shown. The scan optics subassembly 10 can be for example, like that shown in U.S. Pat. No. 5,214,441, the disclosure of which is incorporated herein by reference. The scan optics subassembly 10 produces a scan line of laser illumination, shown by chain line 14. In operation, the scan optics subassembly 10 scans a line on a rotating drum in a laser scanner. As discussed above, during the final assembly of the laser scanner, the scan optics assembly 10 must be precisely aligned with the rotating drum in the laser scanner for the scanner to function properly. To achieve this precise alignment according to the present invention, the scan optics subassembly is first placed on alignment fixture 12 and operated and adjusted until the scan line 14 is in correct alignment.

The alignment fixture 12 includes a pair of spaced apart cylindrical reference surfaces 18 and 20, a reference pin 22, and a pair of quad cell detectors 24 and 26. The alignment fixture 12 includes two X-Z translation stages 30 and 32 located on the ends of the alignment fixture 12 for providing adjustment of the alignment fixture 12 relative to the scanner optics subassembly 10 in the X, Z, θx and θz directions. The relative Y and θy positions are set by fixed features (not shown) on the alignment fixture 12.

During pre-assembly, the scan optics subassembly 10 is secured relative to the alignment fixture 12. Power is applied to the scan optics subassembly 10 to produce a scan line 14 and the translation stages 30 and 32 are adjusted until the scan line 14 is precisely aligned with the alignment fixture 12, as detected by quad sensors 24 and 26. When the scan optics subassembly 10 is properly aligned with the alignment fixture 12, three non-coplanar sheet flexures 46, 48 and 50 are mechanically attached to the scan optics assembly with screws 52. Each of the sheet flexures has an alignment feature that is complementary to an alignment feature on the alignment fixture. For example the sheet flexures 46 and 48 are provided with v-shaped notches 54 and 56 which are adapted to engage with the cylindrical reference surfaces 18 and 20 on the alignment fixture 12, and the sheet flexure 50 is provided with an elongated slot 58, one edge of which is adapted to engage with the reference pin 22 on the alignment fixture 12. Before the screws 52 are tightened to securely fix the sheet flexures to the scan optics subassembly, the alignment features on the sheet flexures are brought into and held in engagement with the complementary alignment features on the alignment fixture 12. After the screws 52 are tightened, the scan optics subassembly 10, with the attached flexures 46, 48 and 50 is removed from the alignment fixture.

Figure 2:
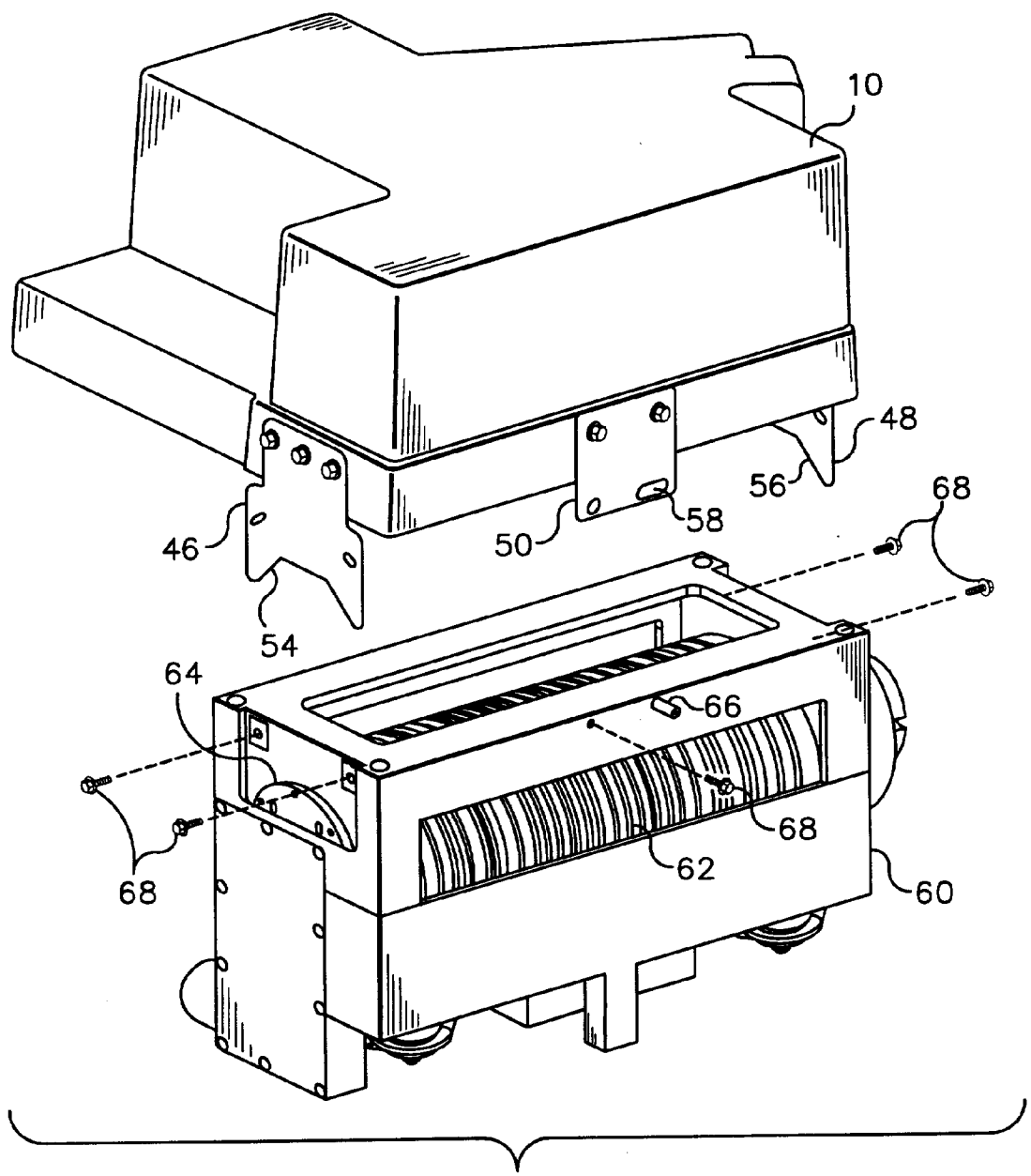
FIG. 2 is a perspective view showing the first subassembly with sheet flexures having alignment features aligned with and attached to a second sub assembly having corresponding alignment features according to the present invention.

Referring now to FIG. 2, this stage of the assembly of the laser scanner is completed by aligning and rigidly attaching the scan optics subassembly 10 to the scanner body subassembly 60 using the flexures 46, 48 and 50. The scanner body subassembly 60 includes a recording drum 62. A pair of spaced apart cylindrical alignment features (only one of which 64 is shown) are provided on the scanner body subassembly 60. A reference pin 66 is also included on the scanner body subassembly 60. The cylindrical alignment features 64 are coaxial with the recording drum 62 and the cylindrical alignment features and the reference pin 64 are located in identical positions with respect to the scan line produced by the scan optics subassembly as were the corresponding alignment features 18, 20 and 22 on the alignment fixture 12. The scan optics subassembly 10 is placed on the scanner body subassembly 60 such that the alignment features 54, 56 and 58 in the flexures 46, 48 and 50 respectively, are in contact with their corresponding alignment features 64, and in reference pin 66 on the scanner body subassembly 60, and the flexures are mechanically secured to the scanner body subassembly 60 with screws 68.

The flexures 46, 48 and 50 provide a rigid connection between the subassemblies that is not subject to change due to shock or deformation. When fastened to the scanner body subassembly, the flexures may deflect slightly out of their planes by some small amount, thus compensating for mechanical tolerances, however, the attachment to the scanner body subassembly will not affect the load on the alignment features, and once fastened, the clamped areas around the screw will bear any shock loading without deformation. The minimum requirement for achieving a three dimensionally rigid connection using just three sheet flexures is that no two sheet flexures be coplanar. More than three sheet flexures can also be used.

The invention has been described in detail with particular reference to certain preferred embodiments thereof, but it will be understood that variations and modifications can be effected within the spirit and scope of the invention. For example, although the invention has been described with reference to a laser scanner, it will be understood that the technique of the present invention can be employed to assemble subassemblies whenever a precise rigid connection between subassemblies is required.

PARTS LIST 10 optics subassembly
12 alignment jig
14 chain line
18 cylindrical reference surfaces
20 cylindrical reference surfaces
22 reference pin
24 quad cell detectors
26 quad cell detectors
30 translation stages
32 translation stages
46 noncoplanar sheet flexure
48 noncoplanar sheet flexure
50 noncoplanar sheet flexure
52 screws
54 v-shaped notch
56 v-shaped notch
58 elongated slot
60 scanner body subassembly
62 recording drum
64 cylindrical alignment features
66 reference pin
68 screws

What is claimed is:

1. A laser scanner, comprising:

a) a scan optics module;

b) a scanner body having a recording drum, the scanner body defining a plurality of alignment features; and c) a flexure coupling for aligning and rigidly connecting the scan optics module to the scanner body, the flexure coupling including three noncoplanar sheet flexures each defining an alignment feature for cooperating with a corresponding alignment feature on the scanner body for aligning the scan optics with the scanner body and rigidly supporting the scan optics module with respect to the scanner body, each sheet flexure defining a plurality of oversize holes for securing the flexure to the scanner body with screws after alignment of the scan optics module with the scanner body.

2. The laser scanner claimed in claim 5, wherein the recording drum has a rotational axis; the alignment features on the scanner body include a pair of spaced apart circularly cylindrical surfaces co-axial with the rotational axis of the recording drum; and the corresponding alignment features on two of the sheet flexures are v-shaped features adapted to cooperate with the circularly cylindrical surfaces.

3. The laser scanner claimed in claim 2, wherein the alignment features on the scanner body include a hole for receiving a bolt, and the corresponding alignment feature on the third sheet flexure is an elongated hole having an edge that is adapted to engage a bolt in the hole in the scanner body.

* * * * *